Patented Dec. 20, 1949

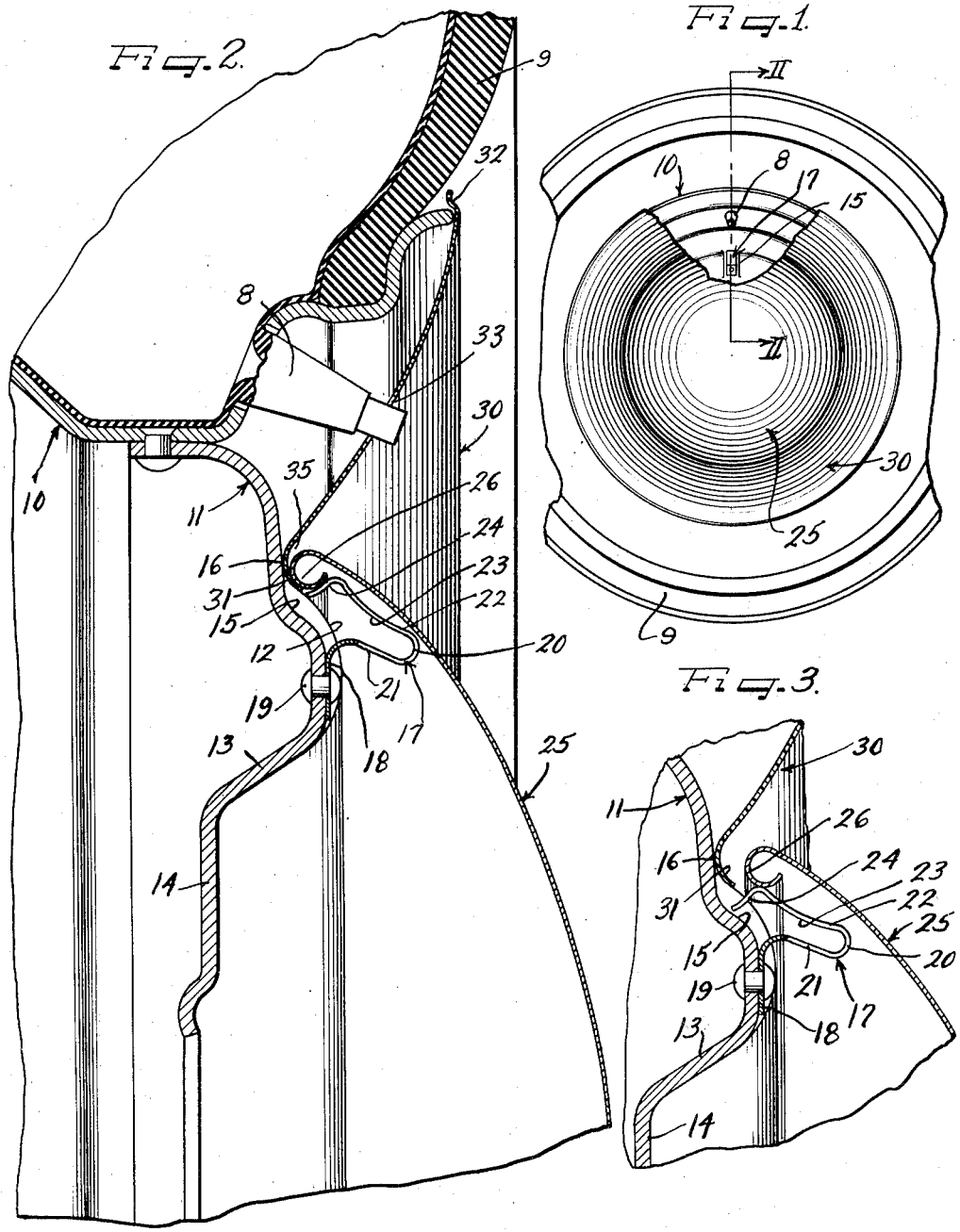

2,491,501

UNITED STATES PATENT OFFICE 2,491,501

WHEEL STRUCTURE

George Albert Lyon, Allenhurst, N. J.

Application July 21, 1945, Serial No. 606,393

7 Claims. (Cl. 301—37)

This invention relates to a wheel structure and more particularly to the provision in a wheel of improved means for retaining wheel trim such as covers and hub caps on the wheel.

In the past it has been common practice to employ in automobile wheels spring clips for retaining a cover or a hub cap on the body part of a wheel. Such clips, which are sometimes called inverted type spring clips, have free extremities over which the edge of the cover or hub cap is adapted to be cammed in the application of the cover to the wheel. During this camming movement the free extremities of the clips must move and hence there must be clearance between the body part and such extremities in order to provide for such movement. As a consequence thereof, it has not been feasible to have the free extremities in as close a cooperation with the body part as is desirable; it, of course, being clear that the closer they are to the body part the more direct will be the retaining pressure that is exerted for holding the cover or hub cap on the wheel.

It is accordingly an object of this invention to provide a wheel structure wherein the free extremities of the hub cap clips can terminate at the normal outer surface of the body part and yet be movable axially inwardly of that surface.

Yet another object of this invention is to provide an improved and simplified mounting for hub cap cover retaining spring clips on a body part which not only provides the necessary clearance for the movement of the free extremities of the clip, but in addition thereto enables reinforcing of the body part at the areas of attachment of the clips thereto.

A still further object of the invention is to provide cover retaining spring clips and a mounting therefor on a wheel body part of such construction that a wheel cover may extend further axially inwardly toward the medial plane of the wheel.

In accordance with the general features of this invention there is provided a wheel structure including a tire rim supported on a body part with which a central hub cap is cooperable, the body part having a plurality of radially rib-like depressions in each of which is supported a cover retaining spring clip with a base portion attached to the body part and with a turned outer free extremity directly opposite a radial outer portion of the depression so that the depression provides clearance for the axial inward movement of the extremity in the application of a cover or hub cap thereto.

Another feature of the invention relates to providing in the aforementioned structure a seat on the body part for one or more covers such as a hub cap and a trim ring and which seat is located at the radial outer ends of the rib-like depressions so that the edges of the cover, with which the spring clips are retainingly cooperable, may be seated axially inwardly of the spring clips and in closer proximity to the medial plane of the wheel.

Other objects and features of the invention will more fully appear from the following detailed description taken in connection with the accompanying drawings which illustrate a single embodiment thereof, and in which:

Figure 1 is a fragmentary side view of a wheel structure embodying the features of this invention and showing the cover structure partly broken away in order to show a retaining spring clip for the cover structure;

Figure 2 is an enlarged cross-sectional view taken on the line II—II looking in a direction indicated by the arrows and showing clearly how the spring clips cooperate with nested cover members to clampingly retain engaging edges of the cover members against the body part of the wheel; and Figure 3 is a fragmentary cross-sectional view similar to Figure 2 but showing the hub cap in the process of being cammed over the free extremities of the spring clips and showing how each free extremity can be moved into a rib-like depression in the body part of the wheel.

As shown on the drawings:

The reference character 9 designates generally a conventional pneumatic tire and tube supported upon the usual multi-flange drop center tire rim 10. This rim part, as is customary, has one of its flanges apertured to permit a valve stem 8 on the tube to extend therethrough so as to be accessible from an outer side of the wheel.

It is also customary in the automobile art to support the tire rim on a body part such, as the part 11, and which is sometimes referred to as a wheel spider. This body part may comprise a dished metallic sheet stamping and is suitably fastened to the base flange of the tire rim 10.

The body part 11 includes a central bulged annular nose portion 12 and a rearwardly inclined portion 13 terminating in a radially extending bolt-on flange 14. This flange, as is well known in the art, is adapted to be secured by means of cap screws or bolts (not shown) to a part on the axle.

The bulged annulus or nose portion 12 is provided with a plurality of generally radially extending rib-like depressions 15 which correspond in number to the number of hub cap retaining spring clips and which may be three to five in number as desired. These rib-like depressions 15 are preferably equidistantly spaced from each other and while extending generally radially are inclined slightly toward the medial plane of the wheel. The outer portions of these depressions terminate at a cover seat portion on the body part designated generally by the reference character 16.

Cooperable with each of these depressions 15 is an inverted type of resilient spring clip 17. Since these spring clips are all identical in construction, a description of one will suffice for all.

Each of the spring clips includes a base portion 18 secured as by means of a rivet 19 to the bottom of the rib-like depression 15 at the radially inner end of the depression. It is, of course, clear that due to the aperturing of the body part for the accommodation of the rivets 19, the body part is at the areas of these apertures weakened. This inherent weakness in the structure of the body part is offset by the rib-like depressions. In other words, the rib-like depressions provide corrugations at the rivets which tend to augment the inherent rigidity of the body part at the location of the rivets.

Each of the spring clips, in addition to the base portion 18, includes an axial outer loop portion 20 comprising two spaced legs 21 and 22 which are inclined axially and radially toward the central axis of the wheel. The outermost leg 22 is slightly depressed at 23 so as to provide ample clearance between each of the clips and a central cover or hub cap 25 cooperable therewith. The outermost leg 22 terminates in a turned free extremity 24 which is inclined toward the body part and toward the axis of the wheel but in a generally opposite direction from the direction of the inclination of the two legs 21 and 22.

One of the improved features of this invention is to so locate the free turned extremity 24 of each of the clips that it terminates substantially at the normal contour of the outer surface of the body part and can yet move in and out of the rib-like depression 15. This enables the depression 15 to provide clearance for the movement of the free extremity 24 of each of the clips 17 whereby said extremity can move into the depression in the application of the hub cap 25 thereto as is shown in Figure 3. This is highly desirable in that it enables the clamping free extremities of the clips to be brought into closer proximity to the seat portion 16 to which cooperating nested edges of the hub cap 25 and the annular cover 30 are clamped.

The central hub cap 25 may comprise a metallic stamping and includes an under-turned reinforcing edge 26 of a diameter such that it can be cammed over the high areas of the turned free extremities 24 of the spring clips as shown in Figure 3. In addition this turned edge 26 is adapted to nestingly engage a radially inner turned edge 31 of the outer annular cover member 30. Thus, both cover members 25 and 30 can be nestingly clamped against their seat 16 on the body part by the resilient spring clips 17.

The outer annular cover member 30 includes an outer turned edge 32 which slightly overhangs an outer edge of the tire rim 10 and is in close proximity to the outer side wall of the tire 9. The cover member 30 is of such dished cross-sectional contour that it extends generally radially and axially inwardly from the edge 32 to the edge 31. If desired, this member 30 may have a slightly convex or bowed cross-sectional contour. In any event, the inclination or cross-section is such that in use the ring 30 will appear to constitute a continuation of the outer side wall of the tire. Thus, if this member 30 is given a white external finish it will in use give the illusion of constituting a white side wall of the tire, thereby giving the appearance of the tire being a massive one extending clear down to the outer turned edge of the hub cap 25.

Also, the cover member 30 may be provided with an aperture 33 through which the outer end of the valve stem may extend in order to afford access to the same. On the other hand, if a shorter type of valve stem is used, so that it will not project through the cover member 30, then access may be had to the same by manually flexing the cover member 30 away from the tire to a sufficient extent to permit the application of the nozzle of a hose to the valve stem.

The cover member 30 may be made of any suitable material such as metal or plastic. In the event that it is made of plastic sheet, it must be resiliently flexible so it can then be manually deflected in order to afford access to parts to the rear thereof, such as the valve stem 8 or wheel balancing weights (not shown). Any suitable plastic material may be used which is self-sustaining as to form and yet resiliently deflectable without permanent deformation. I have found that the ethyl cellulose, vinyl resin, and cellulose acetate thermoplastics are suitable for this purpose.

In the application of the covers of my invention to the wheel, the cover 30 is first aligned with the wheel and placed thereover so that its inner turned edge 31 is resting on the seat portion 16 of the body part 11. Thereafter the hub cap 25 is aligned with the center of the wheel and its outer turned edge 26 is progressively cammed over the free extremities of the spring clips as shown in Figure 3 until its edge 26 is tightly nested in the edge 31 of the outer cover member as shown in Figure 2. When the covers are in this position the spring clips are exerting an axial and resilient clamping pressure against the nested edges of the cover to tightly clamp them to the seat portion 16 on the body part 11 which is in close proximity to the medial plane of the wheel.

From Figure 2 it will be noted that there is a slight clearance at 35 between the edge 26 of the hub cap 25 and the inner margin of the cover member 30 which is sufficient to permit of the introduction of the tip of a pry-off tool between the cover members. Such a pry-off tool can act in the usual way to forcibly pry the hub cap from its retaining cooperation with the spring clips.

In the event a plastic outer cover or ring is used the cover ring may be manually deflected at the outer edge to an extent sufficient to permit of the introduction of a pry-off tool therebehind. In that event the pry-off force can be applied to the nested edges of the cover or trim members

I claim as follows:

1. In a wheel structure including a tire rim, a body part engageable by a hub cap and having an axially outwardly protruding annular nose portion, said nose portion having a plurality of radial rib-like depressions, a plurality of hub cap retaining spring clips carried by said nose portion, each of said clips being mounted in one of said rib-like depressions with a base portion secured in the depression and a generally axially outer return bent loop portion with an under-turned free extremity on the radially outer side of the nose portion opposite a radial outer portion of the depression and movable therein as the spring clip flexes in the application and removal of the hub cap to and from the clips, said depressions providing clearance for the movement of the free extremities of the clips axially rearwardly and also reinforcing the nose portion at the places of attachment of the spring clips thereto to compensate for weakening effected in mounting the clips.

2. In a wheel structure including a tire rim, a body part engageable by a hub cap, said body part having a plurality of radial rib-like depressions, a plurality of hub cap retaining spring clips on the body part, each of said clips being mounted in one of said rib-like depressions with a base portion secured in the depression and a generally axially outer portion with an underturned free extremity opposite a radial outer portion of the depression and movable therein as the spring clip flexes in the application and removal of the hub cap to and from the clips, said depressions providing clearance for the movement of the free extremities of the clips axially rearwardly and also reinforcing the body part at the places of attachment of the spring clips thereto, each of said clips having its base portion connected to the under-turned extremity by a looped portion extending substantially axially outwardly from the depression in which mounted.

3. In a wheel structure including a tire rim, a body part engageable by a hub cap, said body part having a plurality of radial rib-like depressions, a plurality of hub cap retaining spring clips on the body part, each of said clips being mounted in one of said rib-like depressions with a base portion secured in the depression and a generally axially outer portion with an under-turned free extremity opposite a radial outer portion of the depression and movable therein as the spring clip flexes in the application and removal of the hub cap to and from the clips, said depressions providing clearance for the movement of the free extremities of the clips axially rearwardly and also reinforcing the body part at the places of attachment of the spring clips thereto, each of said clips having its base portion connected to the under-turned extremity by a looped portion extending substantially axially outwardly from the depression in which mounted, said looped portion comprising substantially parallel legs inclined axially outwardly toward the center of the wheel, one of said legs being slightly depressed to provide clearance for the hub cap when the same is placed thereover.

4. In a wheel structure, a body part having an annular bulged portion therein provided with spaced generally radially extending rib-like depressions and a plurality of cover retaining spring clips, one for each depression, each of said clips having a radially inner portion fastened to the body part in the depression and an axially outer free portion turned axially rearwardly and positioned for movement in and out the depression, each clip also having a loop-like portion between its free extremity and its attachment to the body portion and which is inclined in radial and axial directions toward the axis of the wheel, said loop portion including a pair of substantially parallel legs, the outer of which terminates in said free extremity and is slightly depressed so as to provide clearance between it and a cover when applied thereto.

5. In a wheel structure including a multi-flanged tire rim and a body part, said body part having a bulged portion provided with a plurality of spaced radially extending rib-like depressions, a plurality of cover retaining spring clips, one for each depression and each having a base portion secured to the bulged portion in the depression and a free radially outer extremity positioned for movement in the depression, a wheel cover having an edge of a diameter to be cammed over the free extremity of the spring clips and to be retained thereby against the body part, the free extremities of said clips moving in the depressions as the edge of the cover is cammed thereover, thereby providing clearance for said extremities and so that they may be in close proximity to the outer side of the body part, and a second radially outer circular cover having a turned portion to seat against the body part and to be clamped thereto by the edge of said first mentioned cover.

6. In a wheel structure including a multi-flanged tire rim and a body part, said body part having a bulged portion provided with a plurality of spaced radially extending rib-like depressions, a plurality of cover retaining spring clips, one for each depression and each having a base portion secured to the bulged portion in the depression and a free radially outer extremity positioned for movement in the depression, a wheel cover having an edge of a diameter to be cammed over the free extremity of the spring clips and to be retained thereby against the body part, the free extremities of said clips moving in the depressions as the edge of the cover is cammed thereover, thereby providing clearance for said extremities and so that they may be in close proximity to the outer side of the body part, and a second radially outer circular cover having a turned portion to seat against the body part and to be clamped thereto by the edge of the said first mentioned cover, said second cover comprising a dished annulus extending radially and axially outwardly from its engagement with the body part and at its outer side being slightly spaced from the edge of the first mentioned cover to provide clearance for the insertion of a pry-off tool between the two covers.

7. In a wheel structure including a tire rim and a body part, said body part being a one-piece pressed sheet metal stamping having an axially outwardly protruding reinforcing nose spaced radially inwardly from the juncture with the tire rim and providing an annular groove at the radially outer side thereof, said nose portion having a plurality of radially extending rib-like depressions therein extending entirely thereacross and including respective terminating portions at the radially outer ends thereof disposed radially inwardly from said groove and within the axially inner plane of the groove, said groove being adapted to afford a seat for a cover member, and a cover retaining clip mounted within each of said depressions and having a base secured to said bulge within the depression and a radially outer extremity connected to the base by an axially outwardly extending loop and projecting into the radially outer extremity portion of the depression adjacent said groove, said clip extremity being free to move into and out of said extremity portion of the depression in the interaction thereof with the cover.

GEORGE ALBERT LYON.

REFERENCES CITED

The following references are of record in the file of this patent:

UNITED STATES PATENTS

| Number | Name | Date |
| --- | --- | --- |
| Re. 22,120 | Lyon | June 16, 1942 |
| 2,196,718 | Ash | Apr. 9, 1940 |
| 2,214,745 | Lyon | Sept. 17, 1940 |
| 2,214,746 | Lyon | Sept. 17, 1940 |
| 2,217,116 | Hunt | Oct. 8, 1940 |